(12) United States Patent
Wenzel et al.

(10) Patent No.: US 6,516,428 B2
(45) Date of Patent: Feb. 4, 2003

(54) ON-CHIP DEBUG SYSTEM (75) Inventors: Andreas Wenzel, Grenoble (FR); Eric Chesters, Mountain View, CA (US); Rod G. Fleck, Mountain View, CA (US); Gary Sheedy, Cupertino, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/235,565

(22) Filed: Jan. 22, 1999

(65) Prior Publication Data

US 2002/0147939 A1 Oct. 10, 2002

(51) Int. Cl.[7] .......................... G06F 11/00; G01R 31/28
(52) U.S. Cl. ............................... 714/28; 714/734
(58) Field of Search ..................... 714/28, 43, 734, 714/738, 724, 32, 741, 736, 30, 733; 702/117; 703/14, 28; 709/208, 400; 324/763, 73.1, 755, 537

(56) References Cited

U.S. PATENT DOCUMENTS

| | | | |
|---|---|---|---|
| 4,500,993 A | * | 2/1985 | Jacobson |
| 4,811,345 A | * | 3/1989 | Johnson |
| 4,829,520 A | * | 5/1989 | Toth |
| 5,032,789 A | * | 7/1991 | Firooz et al. |
| 5,101,151 A | * | 3/1992 | Beaufils et al. |
| 5,491,793 A | | 2/1996 | Somasundaram et al. |

OTHER PUBLICATIONS

"Automatic Trace Multiplexer Control," IBM Technical Disclosure Bulletin, 1994, vol. 37, No. 3, pp. 271–272.

Föckeler and Willeke, "Der Software 'auf die Finger' geschaut," *Elektronik*, 1994, vol. 43, No. 5, pp. 74, 76, 78–82, 84.

Zorian and Jarwala, "Designing Fault–Tolerant, Testable, VLSI Processors Using the IEEE P1149.1 Boundary–Scan Architecture," *IEEE*, 1989, pp. 580–584.

\* cited by examiner

*Primary Examiner*—Gopal C. Ray
(74) *Attorney, Agent, or Firm*—Fish & Richardson P.C.

(57) ABSTRACT

An on-chip debug system includes a data band selector operable to transmit to an emulator the selected data bands generated by the selected components in an integrated circuit. The data band selector is directed by the emulator based upon instructions received from a host computer.

13 Claims, 9 Drawing Sheets

ON-CHIP DEBUG SYSTEM

FIELD OF THE INVENTION

The present invention pertains to the testing of integrated circuits and the like. More specifically, the present invention relates to an on-chip debug system used for functional testing of integrated circuits.

BACKGROUND OF THE INVENTION

Integrated circuits, including processors such as CPUs and the like, require substantial testing, referred to as debugging, in order to assure proper functioning. As integrated circuits become faster and more complex, the need for thorough functional testing becomes even more important.

A number of techniques have been used to provide debug support for an integrated circuit that includes a processor. One such approach utilizes dedicated on-chip logic to provide, for example, a series of break points. A break point is a point in the control flow of the processor that allows the processor execution to be modified. For example, break points can trigger a number of possible events, such as halting the processing in order, for example, to enter a debug monitor mode as well as a monitor mode, etc. The control flow of a device is typically those instructions used by the microprocessor, for example, to execute a particular function. Once the processor has entered the debug monitor mode, execution of the control flow is halted and the processor is put in communication with an external emulation system. Once in communication with the emulation system, a user can view the execution of the processor at the particular break point. By way of example, if a memory transaction is performed at a particular address, that same memory transaction can also be entered into the emulation system and, in turn, viewed by the user.

Conventionally, the chip manufacturer has taken one of two approaches to implementing on-chip logic debug support. In one approach, the chip manufacturer produces 2 variants of the same chip, one production version to be sold and one test chip version dedicated to emulation testing. Unfortunately, using two variants of the same production chip substantially increases the cost of manufacture since all production chips must be duplicated and the test chip will never be sold (producing no revenue for the chip manufacturer). In another approach, the chip manufacturer can implement on-chip logic debug support by dedicating a portion of the production chip real estate to the logic elements required to define the required break points. Unfortunately, dedicating a portion of the production chip real estate to on chip debug support increases design time and adversely impacts the designer's ability to shrink the size of the chip. In addition, in order to minimize the amount of production chip real estate dedicated to on-chip logic requires that the amount of on chip logic be commensurably reduced. This reduction in on chip logic has the effect of reducing the capability of the on-chip logic to adequately provide the necessary debug capabilities. Therefore, in order to compensate for this reduction in on chip debug support, external testers are typically employed greatly increasing the post fabrication back end costs.

Another technique used to provide debug support for a processor is referred to as real time tracing. The real time trace provides the user with the capability to view selected internal bus and selected internal data transactions of the processor during operation. Typically, providing access to the internal busses and internal data transactions requires use of a dedicated bond out chip. Generally, the dedicated bond out chip is formed of a standard production chip with added external busses used to provide the necessary connections to the device under test that allow access to the selected internal busses and data registers. Unfortunately, as the size and complexity of the chip increases, the number of bond out pads required of the dedicated bond out chip increases dramatically. Since the number of bond pads may be limited by the size of the dedicated bond out chip, the amount of information available using the real time trace technique may be reach a practical limit in very large and/or very complex chips. Just the opposite of what is desired with these type devices. In addition, as the speed of the integrated circuits increase, the amount of data in the form of information bits per test cycle increases dramatically. This increase in information rate can exceed the capacity of the emulator and/or any intervening data busses.

In view of the foregoing, it should be apparent that improved on-chip debug systems would be desirable.

SUMMARY OF THE INVENTION

An improved on-chip debug system used to provide debug support for integrated circuits as well as methods for debugging such integrated circuits are described. More specifically, the debug support system is arranged to provide a selected subset of all possible data bands generated by the integrated circuit under test as needed.

In one embodiment of the invention, an integrated circuit useful for selectively providing operational test data of selected internal components is disclosed. In response to control signals, the electrical components generate operating data in the form of data bands. The data bands are used to evaluate the functionality of the integrated circuit. The integrated circuit includes a plurality of I/O lines suitably arranged to couple the electrical components to external circuitry. In response to a test program, the external circuitry provides control signals capable of directing selected electrical components to generate associated data bands. The integrated circuit also includes a data band selector connected to the plurality of electrical components. The data band selector is used for selecting certain ones of the data bands as directed by the control signals based upon instructions included in the test program.

In another embodiment of the invention, the integrated circuit is a system on a chip type integrated circuit.

In yet another embodiment of the invention, an on-chip debug system suitable for functional testing of an integrated circuit is disclosed. The on-chip debug system includes a host computer arranged to perform executable instructions, an emulator connected to the host computer arranged to generate control and logic signals based upon instructions received from the host computer, and a device under test (DUT) integrated circuit connected to the emulator responsive to the control and logic signals generated by the emulator. The device under test (DUT) integrated circuit includes a plurality of electrical components certain ones of which respond to external signals by generating an associated data band indicative of a particular operational characteristic of the electrical component. The device under test integrated circuit also includes a programmable data band selector connected to the certain electrical components. The programmable data band selector is arranged to output selected ones of the data bands based upon control signals received from the emulator by way of a data band selector control line.

In still another embodiment of the invention, the debug system includes a master target board connected to the emulator having a master DUT integrated circuit integrally connected therein, as well as a slave target board connected to the emulator having a slave DUT integrated circuit integrally connected therein. The debug system also includes a comparator connected to the master target board and the slave target board that is used to assure that the master DUT and the slave DUT are operating in synchrony.

In another aspect of the invention, an integrated circuit is disclosed. The integrated circuits includes a plurality of electrical components responsive to external signals to generate data bands, the data bands being operational information. The integrated circuit also includes a data band selector connected to the plurality of electrical components arranged for selecting certain ones of the data bands as directed by control signals generated by external circuitry.

In still another aspect of the invention, a method of debugging an integrated circuit using an on-chip debug system is disclosed. The on-chip debug system includes a host computer arranged to perform executable instructions, an emulator connected to the host computer arranged to generate control and logic signals based upon instructions received from the host computer, and a device under test (DUT) integrated circuit connected to the emulator responsive to the control and logic signals generated by the emulator, the device under test (DUT) integrated circuit includes a plurality of electrical components wherein certain ones of the electrical components respond to external signals by generating an associated data band indicative of a particular operational characteristic of the electrical component, and a programmable data band selector connected to the certain electrical components arranged to output selected data bands based upon control signals received from the emulator by way of a data band selector control line. The testing is performed by selecting a data band to be traced and selecting a break point used to view operational characteristics of a particular parameter at a specific location in a control flow of the DUT integrated circuit. Loading a test program into the emulator, executing the test program, capturing the selected data band, and capturing result data if the break point has been detected. Next, post processing the captured data band, and repeating the method until all data bands have been captured and post processed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

Figure 1A:
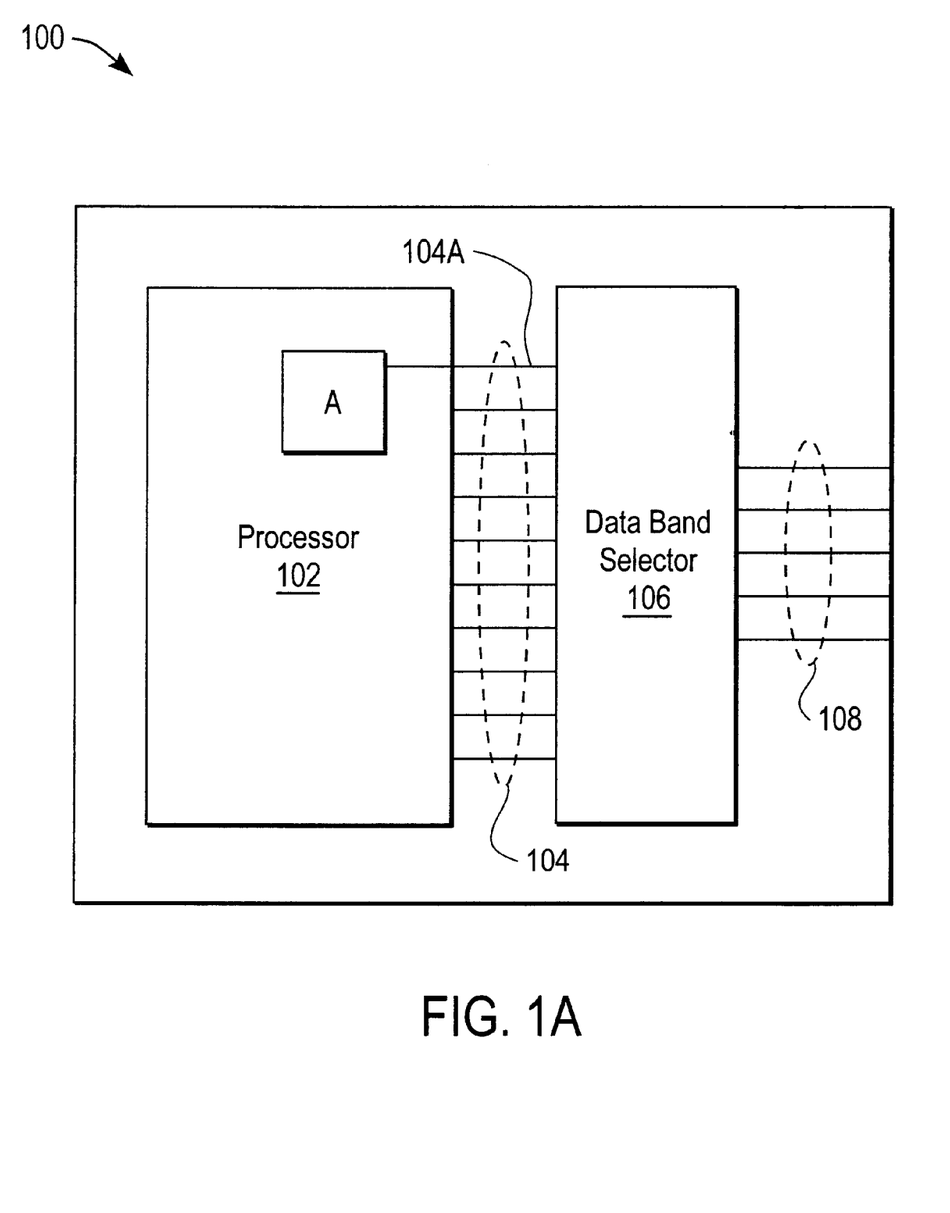
FIG. 1A is a block diagram of a debug system in accordance with an embodiment of the invention.

Referring initially to FIG. 1A, an illustration of a device under test (DUT) integrated circuit 100 in accordance with an embodiment of the invention is shown. The DUT integrated circuit 100 includes a subsystem 102. In one embodiment of the invention, the subsystem 102 can be a processor unit, such as for example a central processing unit (CPU) found in many computer systems, arranged to perform executable instructions stored in, for example, data registers included, but not shown, in the DUT integrated circuit 100. The subsystem 102 can also be printer interface unit, for example, in the case where the DUT integrated circuit 100 is a system on a chip type integrated circuit discussed below. For this example, the subsystem 102 is defined to be a processor unit 102 typical of the CPU. The invention should not, however, be construed to be limited to only CPUs or other processors, but in fact, is useful with any type integrated circuit.

Figure 1B:
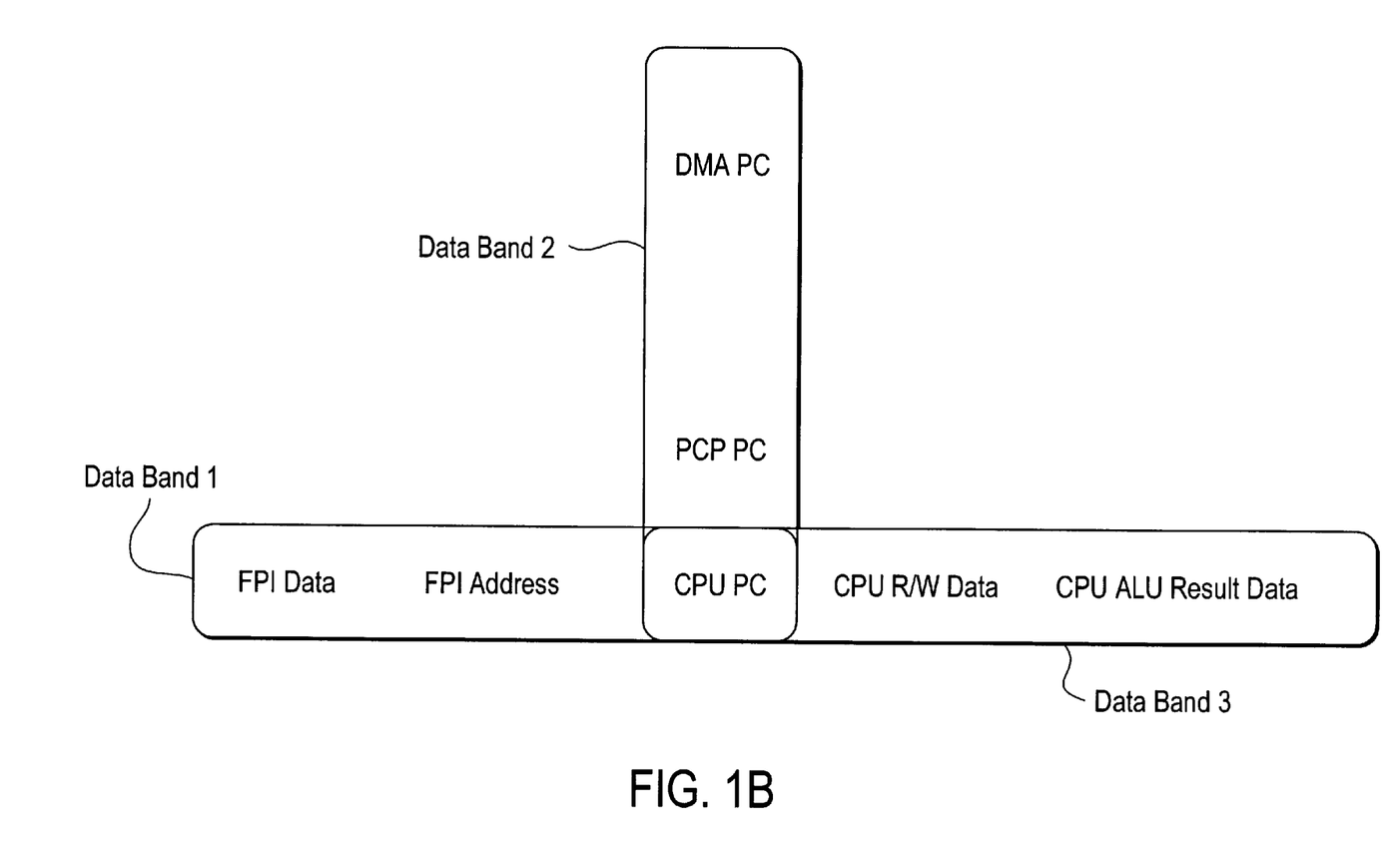
FIG. 1B is an illustration of data band grouping in accordance with an embodiment of the invention.

In a preferred embodiment of the invention, the processor 102 is arranged to generate data bands each being a subset of all available information indicative of selected operational parameters associated with the processor 102. The data bands are formed typically of data bits generated by associated components included in the processor 102 based upon their particular operational characteristics. In this way, at any one particular time, a data band, or trace, representing a subset of all the operational parameters for selected components is user selectable. As shown in FIG. 1B, a data band 1 can FPI data, FPI address, as well as CPU PC information, while a data band 2 can include, for example, DMAIPCP PC and CPU PC information. While a data band 3 can include CPU read/write data, CPU ALU result data, and CPU PC data. It should be noted that these combinations are only exemplary and should not be construed to be limiting.

The components for which the associated data bands are generated are "hardwired" within the processor 102 by way of data band connectors 104. By way of example, the component A included in the processor 102 responds to appropriate external signals by generating the data band 1. The data band 1 is then output to an associated data band connector 104A. In this way, the number of interconnections included in the processor 102 required to provide adequate processor debug capabilities is limited to only those used to generate data bands.

The DUT integrated circuit 100 also includes a programmable data band selector 106 connected to the data band connectors 104 arranged to receive the data bands from components included in the processor 102. The programmable data band selector 106 outputs selected data bands at a data band bus 108. It should be noted that the data band selector 106 is relatively small in size in relation to the total real estate of the integrated circuit 100 and therefore, does not consume an inordinate amount of valuable integrated circuit real estate. In addition, the data band selector 106 is scalable to many different technologies and is not dependent upon any particular integrated circuit fabrication technology platform.

Figure 1C:
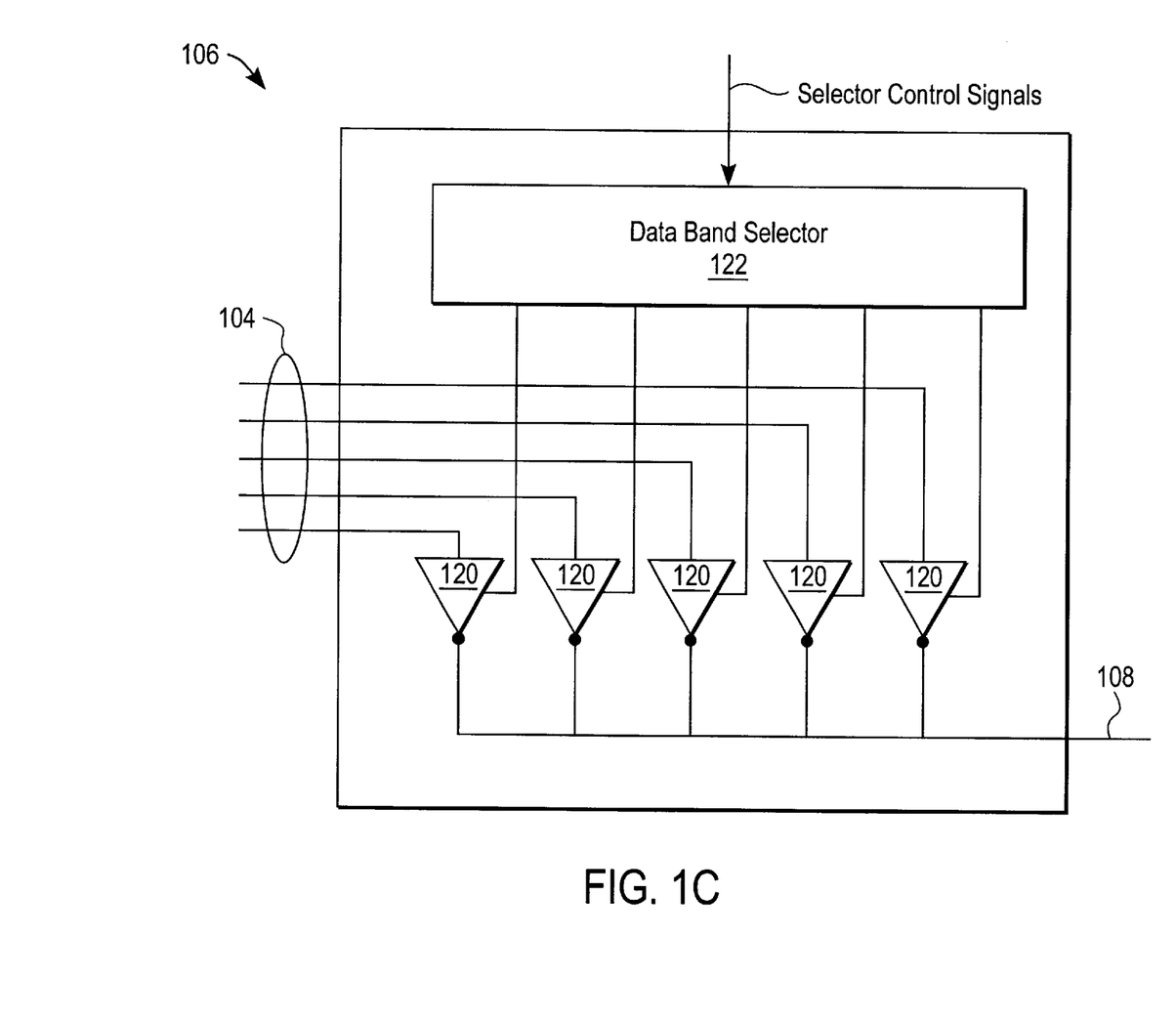
FIG. 1C is an illustration of a tristate driver based data band selector in accordance with an embodiment of the invention.
Figure 1D:
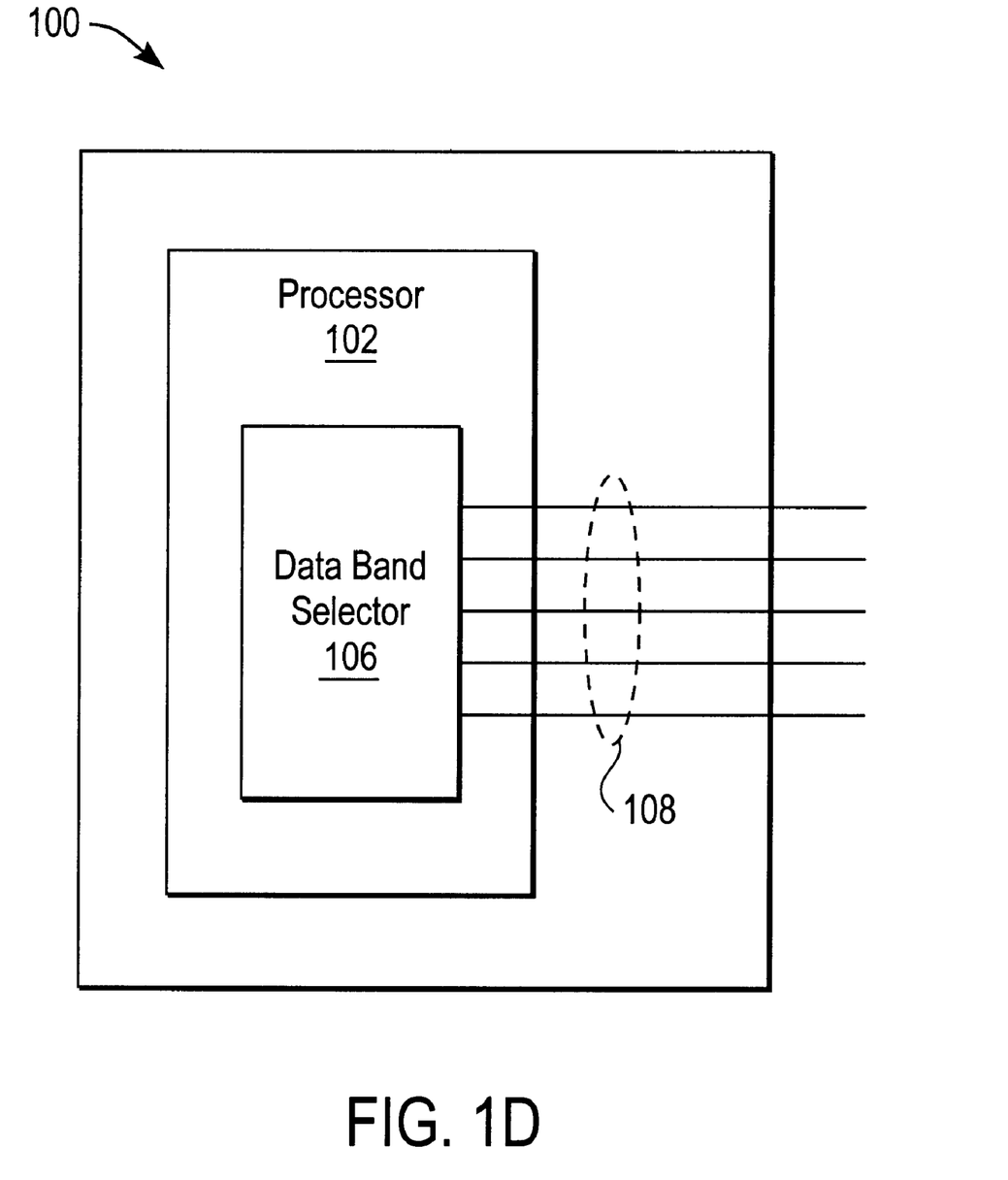
FIG. 1D is an illustration of a data band selector embedded in a processor in accordance with an embodiment of the invention.

In one implementation, the data band selector 106 is a programmable N×M multiplexer having N inputs to the processor 102 and M outputs to an emulator discussed below. The programmable nature of the N×M multiplexer provides the data band selector 106 with the flexibility required to accommodate a large number of combinations of selected data bands. In another implementation, shown in FIG. 1C, the data band selector 106 includes tristate drivers 120 controllably connecting the data band connectors 104 to the data band bus 108. The tristate drivers 120 are in turn controlled by a tristate driver select circuit 122. The tristate driver select circuit 122 is directed by selector control signals generated by external circuitry. Such external circuitry can include the emulator discussed below. This arrangement is suitable for situations where outgoing data flow must be restricted. Such a situation occurs when, for example, the data band bus 108 can only accommodate the information data flow associated with a limited number of data bands. In yet another embodiment of the invention shown in FIG. 1D, the data band selector 106 (which may also include tristate drivers, for example) can be embedded in the processor 102. In this way, the number of outputs from the processor 102 is reduced since the band selection is being performed internally to the processor 102. In the situation where the embedded data band selector includes tristate drivers, the tristate drivers are controlled by the processor 102.

Figure 2:
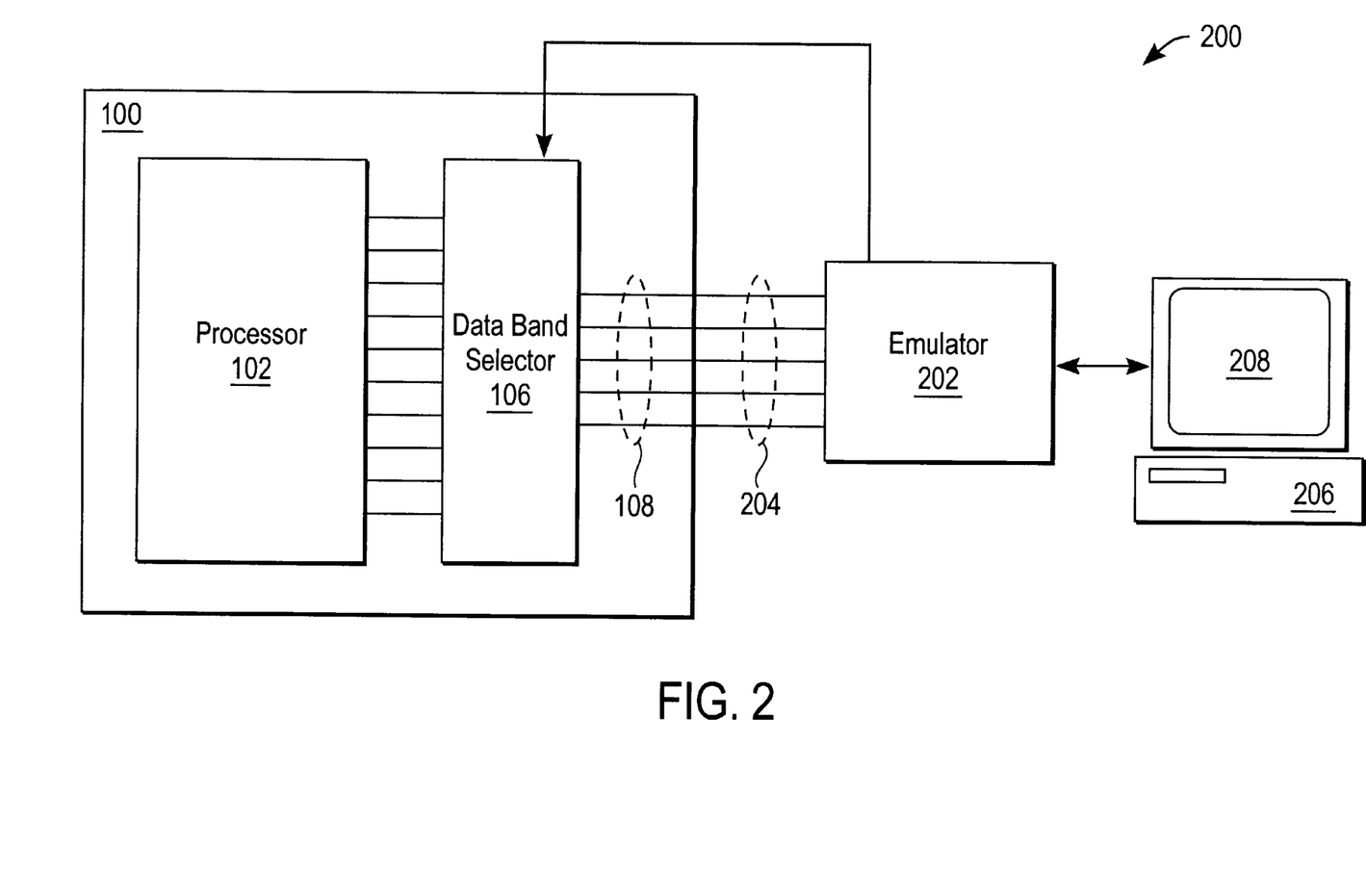
FIG. 2 is a block diagram of an integrated circuit debug system in accordance with an embodiment of the invention.

Referring now to FIG. 2, an integrated circuit debug system 200 in accordance with an embodiment of the invention, is shown. The integrated circuit debug system 200 includes an emulator 202 connected to the DUT integrated circuit 100 by way of an emulator/IC interface data bus 204. The emulator/IC interface data bus 204 connected to the data band selector 106 by way of the data band bus 108 is arranged to carry selected data bands from the data band selector 106 to the emulator 202.

It should be noted that in one embodiment of the invention, connections used to couple the emulator/IC bus 204 and the data band bus 108 can be DUT ("Device Under Test") sockets found in a large number of high speed testers and the like. In a preferred embodiment, however, the DUT integrated circuit 100 is integrally connected to a printed circuit board (PCB), for example, in which case the integrated circuit device under test/PCB is referred to as a target device.

The emulator 202 is also connected to a host computer 206. The host computer 206 provides a user interface between an end user (not shown) and the emulator 202. The host computer 206 typically has a monitor 208 used by the end user to view, for example, test results in either real time or subsequently viewed after a full or partial range of tests on the integrated circuit 100 has been performed.

The host computer 206 also provides the emulator 202 with executable instructions. In one implementation, the emulator 202 processes the received instructions to form a variety of control and logic signals useful in the testing of the DUT integrated circuit 100. The test related control signals provided by the emulator 202 are carried by way of a selector control line 210 connecting the data band selector 106 to the emulator 202. These control signals include selector control signals used by the selector 106 to selectively transmit particular data bands from the processor 102 to the emulator 202 by way of the emulator/IC bus 204. In one implementation, the selection of the data bands is based upon instructions generated by the end user and sent to the emulator 202 by way of the host computer 206. In another implementation, the selection of data bands is based upon instructions generated by software resident in the host computer 206. This arrangement is typical of automatic test equipment having, for example, a central processor coupled to a memory (either local or remote) arranged to generate the desired instruction set.

Providing the capability of selectively choosing which data band, or which combination of data bands, is to be transmitted to the emulator 202 over the emulator/IC interface data bus 204 (as well as the data band bus 108) avoids many of the problems of conventional debug/test systems. By way of example, the problem of data flow overload in either the emulator 202 or either data bus 204 and 108 is avoided by limiting the number of data bands selected or by judiciously grouping the data bands to limit the overall amount of data being processed in a single test cycle.

Figure 3:
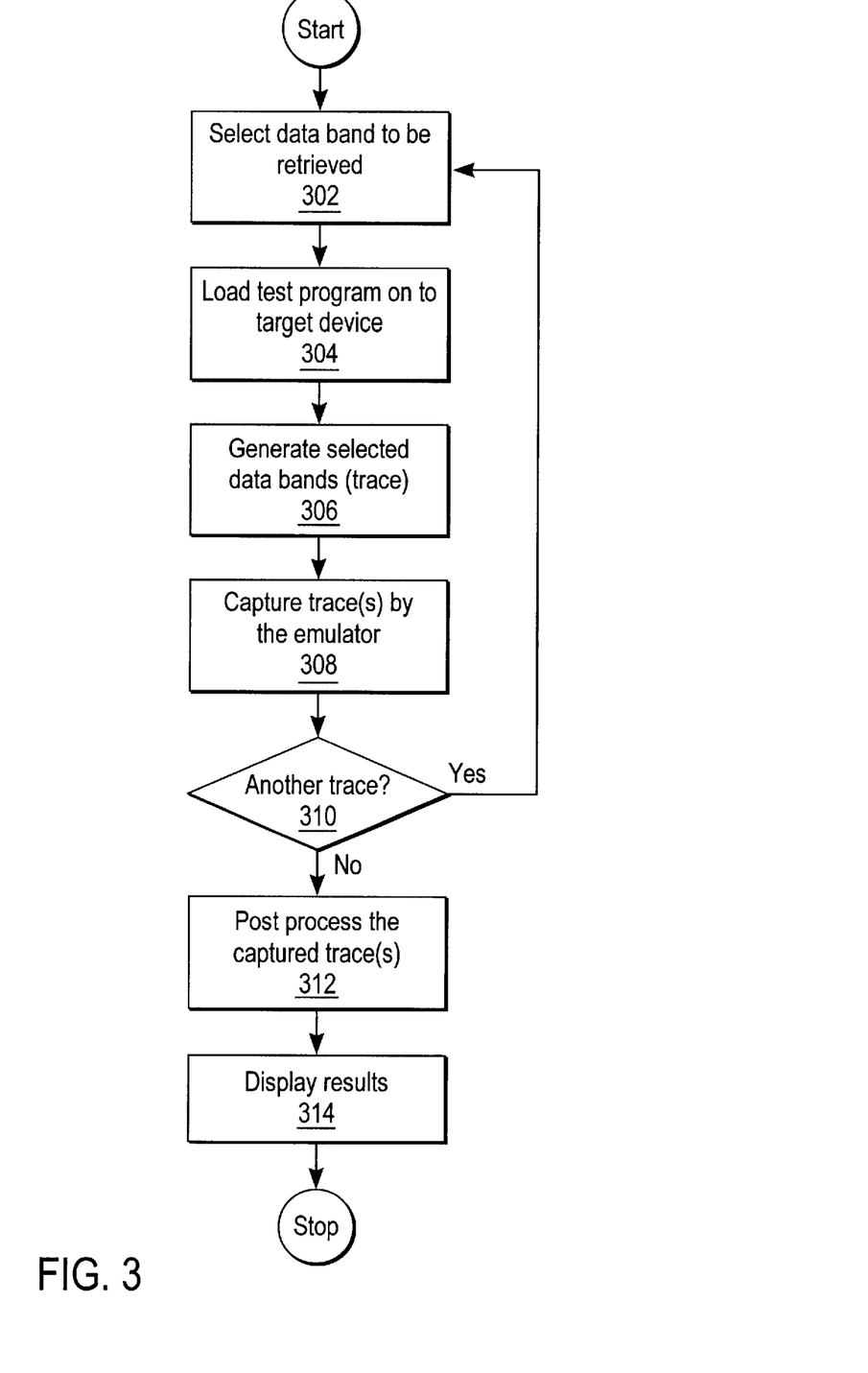
FIG. 3 is a flowchart detailing a method of using an on-chip debug system in accordance with an embodiment of the invention.

FIG. 3 is a flowchart detailing a method 300 of using an on-chip debug system in accordance with an embodiment of the invention. The method of using the on-chip debug system starts by selecting a data band to be retrieved (302). It should be noted that any number of data bands may be selected based upon particular needs and attributes of the various components included in the on chip debug system. Once the particular data band has been selected, the test program is loaded on the target device (304). The test program typically includes executable instructions used by the integrated circuit device under test included in the target device to, for example, produce the desired data band at the appropriate time. Once the program has been loaded onto the target device, the program is executed on the target device so as to generate the selected data band (hereinafter referred to as a trace) (306). The trace is then captured by the emulator connected to the target device (308). The host computer then determines whether another data band is to be captured (310). If it is determined that another data band is to be captured, the next data band is selected (302) and control passes back to (304). If, however, it is determined that no new data band(s) is to be captured, then the emulator proceeds to post process the captured trace(s) (312), the results of which are transmitted to the host computer connected to the emulator and displayed on the monitor (314).

In the case where more than one data band is to be captured, using a single target requires that the test be performed as many times as required to obtain the necessary number of data bands. Once captured, post processing may require that the captured data bands (or traces) be collated. In some instances, the period of time between the capture of various data bands introduces variation due to factors that are difficult to control. Such factors include random variations in processor operations unrelated to the basic operability of the processor under test, variations in test performance due to random flucuations in emulator and/or host computer performance, etc. In order to effectively eliminate these time dependent, and other type, test variations without resorting to time consuming repetition, another embodiment of the invention utilizes a master/slave arrangement.

Figure 4:
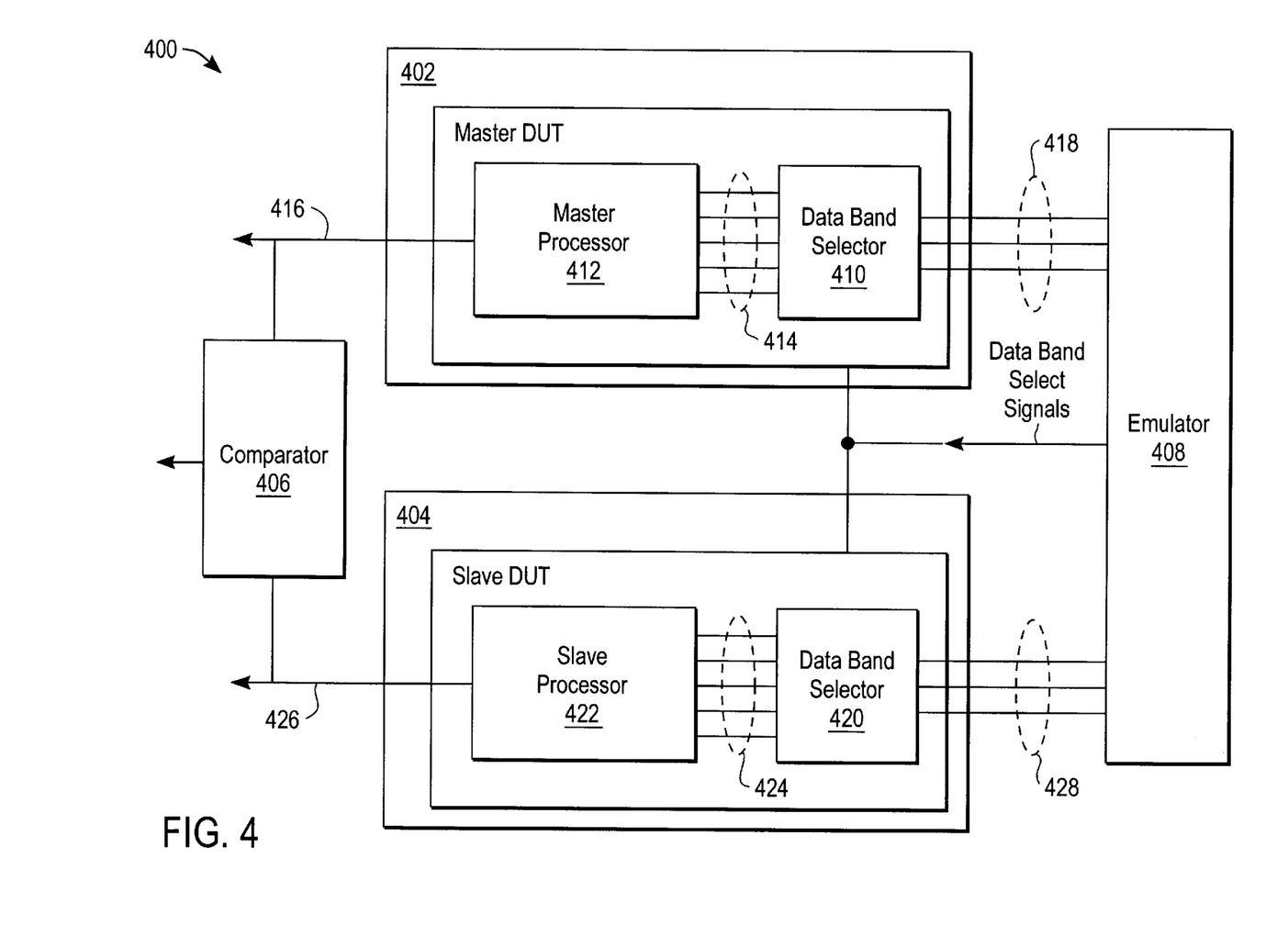
FIG. 4 is an on-chip debug system having a master target device and at least one slave device in accordance with an embodiment of the invention.

FIG. 4 is a master/slave on-chip debug system 400 in accordance with an embodiment of the invention. The master/slave system 400 includes a master target 402, a slave target 404, a comparator 406, and an emulator 408 all connected to a host computer (not shown). It should be noted that the master target 402 and the slave target 404 are substantially identical in order to minimize variations caused by factors other than chip performance. The master target 402 includes master device under test (DUT) having a data band selector 410 connected to a processor 412 by way of data band bus 414. The processor 412 outputs a master target calibration signal at an output line 416 received by the calibrator 406. The data band selector 410 is connected to the emulator 408 by way of a bus 418 arranged to carry selected data bands generated by the master processor 412 as directed by the emulator 408.

The slave target 404 includes slave device under test (DUT) having a data band selector 420 connected to a processor 422 by way of data band bus 424. The processor 422 outputs a slave target calibration signal at an output line 426 received by the calibrator 406. The data band selector 420 is connected to the emulator 408 by way of a bus 428 arranged to carry selected data bands generated by the slave processor 412 as directed by the emulator 408.

The master/slave on-chip debug system 400 is arranged to substantially simultaneously generate selected data bands during a single test cycle. This arrangement avoids inaccuracies due to random variations in chip performance caused by repeated tests performed in order to capture the desired data bands. It is important to note, calibration error is avoided since the master DUT and the slave DUT are kept in synchrony by the action of the comparator 406.

In operation, the host computer loads the required test programs into both the master DUT and the slave DUT. Based upon instructions supplied by the host computer, the emulator 408 sends a data band select signal to the data band selectors 410 and 420 indicating which data band, or bands, each of the data band selectors are to provide. By way of example, if a data band A and a data band B are to be generated in one test cycle, the emulator 408 sends a data band select signal $A_{select}$ to the data band selector 410 and a data band select signal $B_{select}$ to the data band selector 420. A test start signal is then sent by the emulator 408 to both the master DUT and the slave DUT. The master DUT then outputs a master DUT calibration signal at the output line 416 substantially simultaneously with the slave DUT outputting a slave calibration signal at the output line 426. The calibrator 406 then compares the calibration signals generated by the master DUT and the slave DUT and determines that both the master DUT and the slave DUT are operating in synchrony. It should be noted, that in a preferred embodiment, the comparator 406 is continuously checking to assure that both master DUT and slave DUT are in synch. If the comparator 406 determines that the master DUT and the slave DUT are not in synch, then a signal indicating as such is sent to the host computer which in turn takes appropriate actions.

Once the comparator 406 determines that the master DUT and the slave DUT are operating in synch, the emulator 408 captures a data band A generated by the master DUT substantially simultaneously with the capture of a data band B generated by the slave DUT. The emulator 408 then transmits both the data bands A and B to the host computer for post processing. This procedure can be repeated as many times as necessary to capture as many data bands as may be required.

It should be noted that different break point criteria can be set in the master DUT and each of the slave DUTs. In this way, the maximum number of breakpoints capable of being set is at least (n+1) where n is the number of slave DUTs.

In another embodiment of the invention, if a large number of data bands are required to be captured during a single test cycle, any number of slave targets can be used in conjunction with the master target. It should be noted, however, that each of the slave targets must be in synch with the master target.

Figure 5:
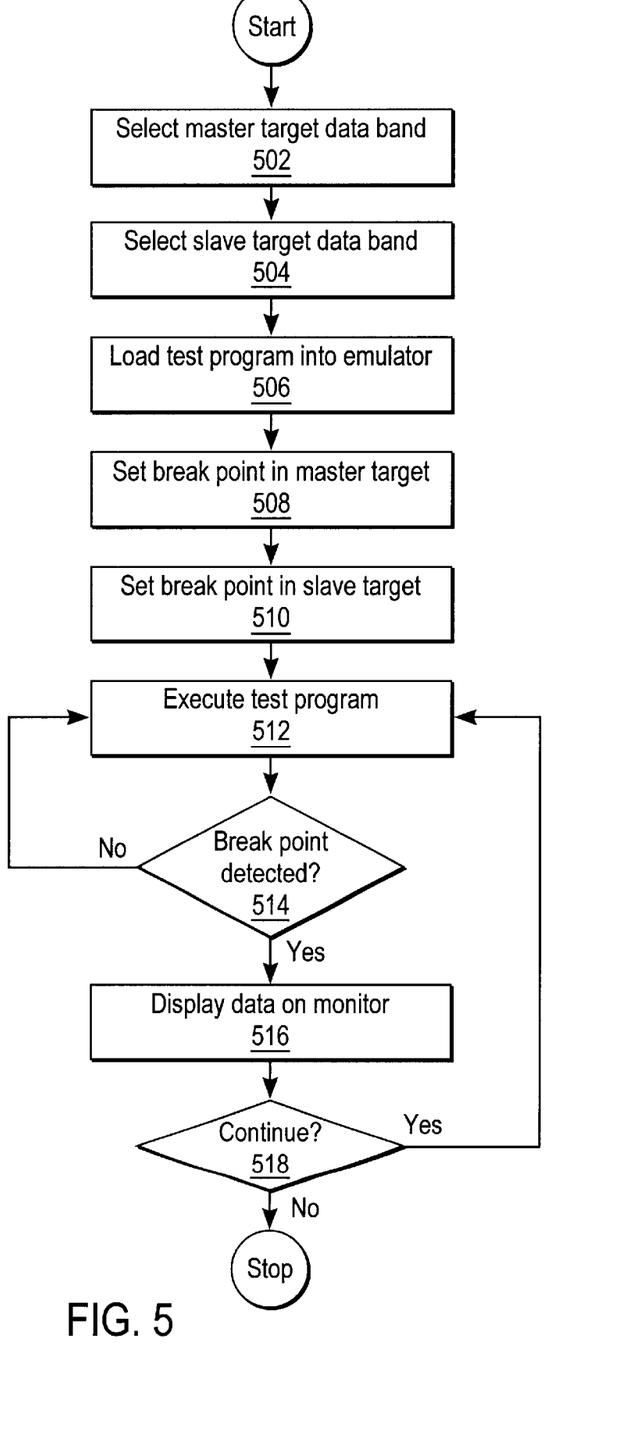
FIG. 5 is a flowchart detailing a method of using an on-chip debug system a master target device and at least one slave device in accordance with an embodiment of the invention.

FIG. 5 is a flowchart detailing a method 500 of using a master/slave on-chip debug system in accordance with an embodiment of the invention. The method of using the master/slave on-chip debug system starts by selecting a master target data band to be retrieved (502). Once the master data band is selected, corresponding slave data band(s) is selected (504). It should be noted, that as many slave bands as may be required are selected at this point. Once all the master data bands and associated slave data band(s) are selected, the host computer loads the test program into the emulator (506). Once the test program has been loaded into the emulator, various break points are set in the master target be setting appropriate data registers in the master DUT (508). Once the break points have been set in the master DUT, associated break points are set in the slave DUT(s) (510). Once all the break points have been set in the master and slave DUTs, the test program is executed by the emulator (512). If no break point is detected (514) during execution of the test program, control is returned to (512). If, however, during execution, a break point is detected (514), then the results are passed to the host computer and displayed on the monitor (516). If the host computer (or end user, if any) determines that after review of the break point data execution of the program should continue (518), then execution of the program is resumed and control is returned to (512). If, however, it is determined that the execution of the program should not continue, then the program is halted.

Figure 6:
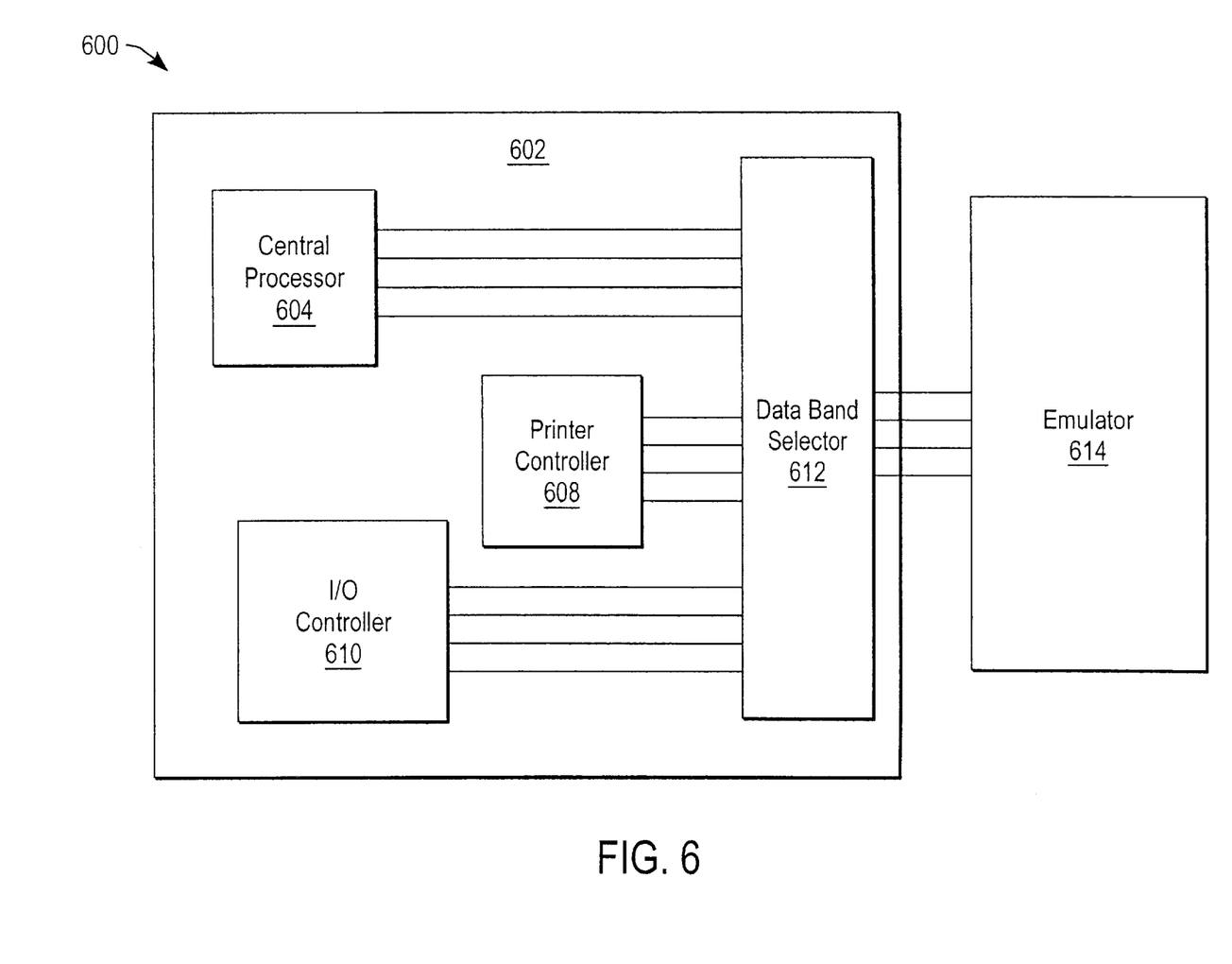
FIG. 6 is an on-chip debug system suitable for debugging a system on a chip type integrated circuit in accordance with an embodiment of the invention.

FIG. 6 is an on-chip debug system 600 suitable for debugging a system on a chip type integrated circuit in accordance with an embodiment of the invention. The on chip debug system 600 includes a system on a chip type integrated circuit 602. The chip 602 typically includes any number of systems, such as central processor 604, printer controller 608, input/output controller 610 each capable of generating an associated set of data bands, and the like. Each of the systems 602–610 are connected to a data band selector 612 arranged to select any combination of data bands as directed by the emulator 614 using data band selector signals.

In operation, the emulator 614 loads a test program on any of the systems 604–610 for which operational data in the form of data bands are desired. Once loaded, the selected systems generate associated data bands which are selectively passed to the emulator 614 by way of the data band selector 612. The emulator 614 then post processes the received data bands in accordance with protocols established by host computer (not shown). The process is repeated as many times as may be required in order to fully evaluate all systems included in the integrated circuit 602.

It should also be noted, that several systems included in the integrated circuit 602 can be tested using a master/slave arrangement described above. By using the master/slave arrangement, many systems included in the integrated circuit 602 can be tested substantially simultaneously.

The described arrangements have numerous advantages. One such advantage is the invention reduces the number of pinouts required in order to debug an integrated circuit.

Other advantages include the fact that two variants of a single production chip is no longer required. In addition, by using a master and slave arrangement, large amounts of data can be evaluated at substantially the same time avoiding time dependent calibration errors. Also, the invention affords a simple and economic approach to debugging system on a chip integrated circuits. In addition, by economizing the transactional data passed to the emulator system by selectively choosing data bands at each test cycle, the potential to overload the emulation system is eliminated. The described invention works well with any circuit, including but not limited to those including microprocessors and the like.

Although only a few embodiments of the present invention have been described in detail, it should be understood that the present invention can be embodied in many other specific forms without departing from the spirit or scope of the invention. Particularly, although the invention has been described primarily in the context of integrated circuits having processor subsystems, the advantages including reduced pinouts are equally applicable to any device capable of generating large amounts of information related to, for example, operation.

Additionally, the debug system characteristics can be varied in accordance with the needs of a particular system. Therefore, the present examples are to be considered as illustrative and not restrictive, and the invention is not to be limited to the details given herein, but may be modified within the scope of the appended claims.

What is claimed is:

1. An integrated circuit useful for providing operational test data, comprising:
   a plurality of electrical components that are responsive to control signals to generate operating data taking the form of data bands, the data bands being used to evaluate the functionality of the integrated circuit;
   a plurality of I/O lines suitably arranged to couple the electrical components to external circuitry outside the integrated circuit, the external circuitry being arranged to provide control signals capable of directing selected electrical components to generate associated data bands in response to a test program; and
   a data band selector connecting the plurality of electrical components to the plurality of I/O lines and arranged for selecting certain ones of the data bands as directed by the control signals based upon instructions included in the test program.

2. An integrated circuit as recited in claim 1, wherein at least one of the electrical components is a processor unit.

3. An integrated circuit as recited in claim 1, wherein the integrated circuit is a system on a chip.

4. An integrated circuit useful for selectively providing operational test data of selected components included therein, the electrical components being responsive to control signals to generate operating data taking the form of data bands, the data bands being used to evaluate the functionality of the integrated circuit, comprising:
   a plurality of I/O lines suitably arranged to couple the electrical components to external circuitry, the external circuitry being arranged to provide control signals capable of directing selected electrical components to generate associated data bands in response to a test program; and
   a data band selector connected to the plurality of electrical components arranged for selecting certain ones of the data bands as directed by the control signals based upon instructions included in the test program, wherein the data band selector includes,
      a plurality of input lines connected to the electrical components,
      an output data bus connected to external circuitry arranged to carry data bands generated by selected electrical components,
      a plurality of tristate drivers having inputs connected to the input lines and outputs connected to the output data bus, and
      a tristate driver selector connected to the tristate drivers arranged to enable selected tristate drivers in response to the control signals.

5. An on-chip debug system suitable for functional testing of an integrated circuit, comprising:
   a host computer arranged to perform executable instructions;
   an emulator connected to the host computer arranged to generate control and logic signals based upon instructions received from the host computer; and
   a device under test (DUT) integrated circuit connected to the emulator responsive to the control and logic signals generated by the emulator, the device under test (DUT) integrated circuit including,
      a plurality of electrical components wherein certain ones of the electrical components respond to external signals by generating an associated data band indicative of a particular operational characteristic of the electrical component, and
      a programmable data band selector connected to the certain electrical components arranged to output selected data bands based upon control signals received from the emulator by way of a data band selector control line.

6. A debug system as recited in claim 5, further comprising:
   a master target board having a master DUT integrated circuit integrally connected therein, the master target board being connected to the emulator;
   a slave target board having a slave DUT integrated circuit integrally connected therein, the slave target board being connected to the emulator; and
   a comparator connected to the master target board and the slave target board, the comparator being arranged to receive a master calibration signal output by the master DUT integrated circuit during operation and to receive a slave calibration signal output by the slave DUT integrated circuit during operation, the comparator compares the master calibration signal and the slave calibration signal and outputs an associated comparator output voltage indicative of the synchrony of operation of the master and slave DUT integrated circuit.

7. A debug system as recited in claim 6, wherein the comparator output voltage causes the host computer to direct the emulator to halt debugging of the master DUT integrated circuit and the slave DUT integrated circuit whenever the comparator output signal indicates the master DUT integrated circuit and the slave DUT integrated circuit are not operating in synchrony.

8. A debug system as recited in claim 7 wherein the host computer is a PC.

9. A debug system as recited in claim 7 wherein the host computer is a workstation.

10. A debug system as recited in claim 7 wherein emulator is an automatic tester, the automatic tester incorporating a central processor, a memory, and an I/O device, the automatic tester being arranged to supply instructions to the DUT integrated circuit and post process data bands received from the data band selector.

11. A debug system as recited in claim 5, wherein the DUT integrated circuit is a system on a chip.

12. A debug system as recited in claim 11, wherein the chip includes a plurality of systems, and wherein each of the systems generates an associated set of data bands indicative of selected operational characteristics of that system.

13. A method of debugging an integrated circuit using an on-chip debug system, the on-chip debug system includes a host computer arranged to perform executable instructions, an emulator connected to the host computer arranged to generate control and logic signals based upon instructions received from the host computer, and a device under test (DUT) integrated circuit connected to the emulator responsive to the control and logic signals generated by the emulator, the device under test (DUT) integrated circuit includes a plurality of electrical components wherein certain ones of the electrical components respond to external signals by generating an associated data band indicative of a particular operational characteristic of the electrical component, and a programmable data band selector connected to the certain electrical components arranged to output selected data bands based upon control signals received from the emulator by way of a data band selector control line, comprising:

(a) selecting a data band to be traced;

(b) selecting a break point used to view operational characteristics of a particular parameter at a specific location in a control flow of the DUT integrated circuit;

(c) loading a test program in the emulator;

(d) executing the test program;

(e) capturing the selected data band;

(f) capturing result data if the break point has been detected;

(g) post processing the captured data band; and (h) repeating (a) through (g) until all data bands have been captured.

* * * * *

UNITED STATES PATENT AND TRADEMARK OFFICE
CERTIFICATE OF CORRECTION

PATENT NO.     : 6,516,428 B2
DATED          : February 4, 2003
INVENTOR(S)    : Wenzel et al.

It is certified that error appears in the above-identified patent and that said Letters Patent is hereby corrected as shown below:

<u>Title page, Item [54] and Column 1, line 1,</u>
Title, after "SYSTEM", insert -- WITH A DATA BAND SELECTOR --.

Signed and Sealed this

Nineteenth Day of August, 2003

JAMES E. ROGAN
*Director of the United States Patent and Trademark Office*